(12) United States Patent
Corr et al.

(10) Patent No.: US 6,710,216 B1
(45) Date of Patent: Mar. 23, 2004

(54) METHOD AND APPARATUS FOR RECOVERING A SOLVENT

(75) Inventors: Stuart Corr, Warrington; Paul A. Dowdle, St Helens; Robert E. Low, Northwich; James David Morrison, Northwich; Frederick Thomas Murphy, Frodsham, all of (GB)

(73) Assignee: Imperial Chemical Industries PLC, London (GB)

( * ) Notice: Subject to any disclaimer, the term of this patent is extended or adjusted under 35 U.S.C. 154(b) by 145 days.

(21) Appl. No.: 09/654,746

(22) Filed: Sep. 5, 2000

(30) Foreign Application Priority Data

Sep. 6, 1999 (GB) ............................................ 9920947

(51) Int. Cl.⁷ .............................................. C07C 17/38
(52) U.S. Cl. ...................... 570/177; 570/179; 570/180
(58) Field of Search ............................... 570/177, 179, 570/180

(56) References Cited

U.S. PATENT DOCUMENTS

| | | |
|---|---|---|
| 4,259,309 A | 3/1981 | Coenen et al. |
| 4,380,506 A | 4/1983 | Kimura et al. |
| 4,781,041 A | 11/1988 | Fowler |
| 5,018,540 A | 5/1991 | Grubbs et al. |
| 5,034,132 A | 7/1991 | Miyakawa et al. |
| 5,248,393 A | 9/1993 | Schumacher et al. |
| 5,516,923 A | 5/1996 | Hebert et al. |
| 5,824,225 A | 10/1998 | Powell et al. |
| 5,837,106 A | 11/1998 | Ng et al. |

FOREIGN PATENT DOCUMENTS

| | | |
|---|---|---|
| EP | 01155903 | 6/1989 |
| EP | 0 404 475 A2 | 12/1990 |
| EP | PCT/GB00/03387 | 4/2000 |
| GB | 203109 | 9/1923 |
| GB | 2 288 552 A | 10/1995 |
| GB | 0020892.6 | 9/2000 |
| JP | 7000706 A | 1/1995 |
| WO | WO91/04678 | 4/1991 |
| WO | WO 94/20486 | 9/1994 |
| WO | WO95/26794 | 10/1995 |

*Primary Examiner*—Alan Siegel
(74) *Attorney, Agent, or Firm*—Cook, Alex, McFarron, Manzo, Cummings & Mehler, Ltd.

(57) ABSTRACT

In a closed-loop biomass extraction apparatus (10), strategies for purifying HFC solvents used therein include:

(i) contacting an adsorbent and a desiccant, e.g. in a container (26) with contaminated HFC solvent branched from the main flow loop; and, optionally, (ii) washing contaminated HFC solvent with water, e.g. in a vessel (34) to separate a co-solvent or entrainer, such as ethanol, therefrom.

36 Claims, 3 Drawing Sheets

METHOD AND APPARATUS FOR RECOVERING A SOLVENT

This invention concerns recovery of a solvent, especially a hydrofluorocarbon (HFC) solvent used in the exaction of components from materials of natural origin. Herein such materials are termed "biomass" and the extraction of such components "biomass extraction".

The extraction of flavours, fragrances or pharmaceutically active components from materials of natural origin using chlorine-free solvents based on hydrofluorocarbons is of growing technical and commercial interest. In order to avoid the undesirable release of such solvents to atmosphere, the HFC-based solvents are normally utilised in a closed-loop extraction system configuration.

By the term "hydrofluorocarbon" we are referring to materials which contain carbon, hydrogen and fluorine atoms only and which are thus chlorine-free.

Preferred hydrofluorocarbons are the hydrofluoroalkanes and particularly the $C_{1-4}$ hydrofluoroalkanes. Suitable examples of $C_{1-4}$ hydrofluoroalkanes which may be used as solvents include, inter alia, tifluoromethane (R-23), fluoromethane (R-41), difluoromethane (R-32), pentafluoroethane (R-125), 1,1,1-trifluoroethane (R-143a), 1,1,2,2-tetrafluoroethane (R-134), 1,1,1,2-tetrafluoroethane (R-134a), 1,1-difluoroethane (R-152a), heptafluoropropanes and particularly 1,1,1,2,3,3,3-heptafluoropropane (R-227ea), 1,1,1,2,3,3-hexafluoropropane (R-236ea), 1,1,1,2,2,3-hexafluoropropane (R-236cb), 1,1,1,3,3,3-hexafluoropropane (R-236fa), 1,1,1,3,3-pentafluoropropane (R-245fa), 1,1,2,2,3-pentafluoropropane (R-245ca), 1 1,1,2,3-pentafluoropropane (R-245eb), 1,1,2,3,3-pentafluoropropane (R-245ea) and 1,1,1,3,3-pentafluorobutane (R--365mfc). Mixtures of two or more hydrofluorocarbons may be used if desired.

R-134a, R-227ea, R-32, R-125, R-245ca and R-245fa are preferred.

An especially preferred hydrofluorocarbon for use in the present invention is 1,1,1,2-tetrafluoroethane (R-134a).

There are broadly three ways in which the solvent can be managed in such a system;

(a) Once through. A fresh batch of solvent is used for each campaign of biomass extraction in order to minimise inter-product contamination through the solvent or a build-up of undesirable residues within the solvent.

(b) Dedicated solvent. A separate batch of solvent is maintained for each type of biomass to be extracted in order to minimise inter-product contamination through the solvent.

(c) In-situ recovery & recycle. The solvent is recovered and recycled for use between batches of extractions and/or between extraction campaigns.

Option (c) has a number of advantages over (a) and (b), in particular;

Minimisation of the costs of waste solvent disposal through extended processing life.

Minimisation of solvent transport between the site of extraction and a reprocessing facility.

Minimisation of pressurised solvent storage at the extraction site.

all of which are likely to contribute to improved cost-effectiveness for the products of the extraction process. Clearly, in order to implement option (c) an effective and reliable method of ensuring an acceptably low level of inter-batch contaminants is needed. To be effective, the method needs to be capable of removing a wide range of possible organic contaminants from the HFC-based solvent and to dry the solvent prior to storage between extractions.

In extractions where the solvency properties of a single HFC solvent are not capable of providing the desired product in appropriate yield or purity or where the physical properties of the HFC are unfavourable, then the use of a solvent mixture may be required. Typically, these solvent mixtures may be based on blends of HFCs (e.g. R-134a, R-227ea, R-32, R-125 and R-245ca) or on mixtures with essentially co-boiling solvents (e.g. R-134a/dimethyl ether, R-134a/butane or R-134a/$CO_2$). Ethanol represents the most significant member of a third group of co-solvents or entrainers that may be of technological importance in the extraction of materials with HFC-based solvents.

A problem associated with all of these mixtures in a solvent re-use application as described above is that of ensuring a reproducible starting composition for the solvent mixture.

FIG. 1 is a schematic representation of a typical closed-loop solvent extraction cycle.

In the FIG. 1 apparatus 10 biomass is packed into an extraction vessel 11 connected to a closed-loop circuit comprising, in series, a filter 12, a separator in the form of an evaporator 14, a compressor 16 and a condenser/liquid receiver 17.

In use of apparatus 10 a liquid HFC solvent passes through biomass in extraction vessel 11, removing the preferred components therefrom. The liquid solvent/extract mix passes to evaporator 14 where the solvent is evaporated and the preferred components are collected. The preferred components may be e.g. in liquid form, or could be pastes, solids or take other physical forms. Compressor 16 and condenser 17 compress and condense the solvent before returning it to extraction vessel 11 to remove further preferred components from the biomass therein.

Careful distillation of the solvent from the evaporator into the condenser/liquid receiver is likely to result in the removal of the majority of the contaminants from the extraction but in the absence of a properly designed distillation apparatus it is unlikely to be completely effective, resulting in solvent contamination.

According to a first aspect of the invention there is provided a method as defined in Claim 1.

This method is advantageously effective at recovering pure HFC solvent. The process may be conducted repeatedly by recycling the solvent through adsorbent and desiccant materials several times until the desired levels of contaminants and water is achieved. The purification process may be conducted within the circuit of the extraction apparatus, thus acting to continuously solvent-wash the extraction equipment, or in equipment outside of the extraction loop. The aspects of the invention are defined in Claims 2 to 4.

Preferably the adsorbent is carbon-based. More preferably the adsorbent is or includes an activated carbon derived from plant materials such as coconut husk, or from pyrolysis of fossil fuel materials.

Conveniently the desiccant is selected from one or more of aluminosilicate molecular sieves; silica gel; and alumina. Preferably the desiccant is or includes a combination of an aluminosilicate molecular sieve with silica gel and/or alumina. In such a method the molecular sieve advantageously polishes water after gross water removal by the bulk of the silica or alumina.

Preferably the alumina, when present, contains basic sites. These advantageously reduce acidic organic components from the solvent.

Alternatively the alumina, when present, contains acidic sites. These tend to reduce the levels of basic organic contaminants.

The preferred pore sizes in the aluminosilicate molecular sieves used for drying are in the range of 2 Å to 4 Å.

The adsorbent and desiccant materials, when both are used, may be within a single container or in a plurality of individual containers.

Whilst the processing described above will be suitable for HFC mixtures and for mixtures of HFCs with co-boiling components, the large disparity between the physical properties of the HFC and entrainer solvents in the third group necessitates a different approach.

Solutions to this further problem are defined in Claims 12 to 17. Thus it is proposed that the most appropriate way of providing a reproducible starting solvent composition is to remove the entrainer solvent from the HFC fluid at the end of the extraction and to re-introduce the entrainer in a controlled manner at the front-end of the process. For ethanol, the bulk of the entrainer will be retained in the solvent evaporator 14 along with the extract product requiring additional ethanol to be added to the HFC solvent prior to entry into the extraction vessel. During the extraction cycle, the quantity of entrainer returning from the evaporator is not likely to result in any significant problems since the feed rate of added entrainer can be adjusted if desired. If the evaporation temperature is sufficiently high, a significant quantity of ethanol will circulate in the HFC solvent at the end of the extraction. If the levels of ethanol in the HFC are high, they are likely to interfere with the function of both the organic contaminant adsorbent and the desiccant. Under these circumstances, the excess ethanol may be removed by washing the HFC solvent with water prior to the contaminant removal and drying process described above. This water wash can be accomplished by passing the HFC vapour through a pool of water, through a hydrophilic filter material (e.g. cellulose) moistened with water or by washing the liquid HFC with water followed by decantation.

A further advantage of the method of the invention is that it allows an HFC-based mixture to be circulated around the system 10 in order to act as a cleaning fluid between extraction campaigns. Any contaminated entrainer solvent will accumulate in the evaporator and water wash with the HFC component recovered for re-use.

According to a second aspect of the invention there is provided apparatus as defined in Claim 18. Optional features of the apparatus are defined in Claims 19 to 22.

The apparatus of the invention is advantageously suited for practising of the method steps defined herein.

There now follows a description of preferred embodiments of the invention, by way of non-limiting example, with reference being made to the accompanying drawings in which:

BRIEF DESCRIPTION OF THE DRAWINGS

FIG. 2 shows the FIG. 1 apparatus 10 modified to practise the method of the invention. Only the differences compared with the FIG. 1 apparatus are described in detail, the remainder of the apparatus being as in FIG. 1.

Figure 1:
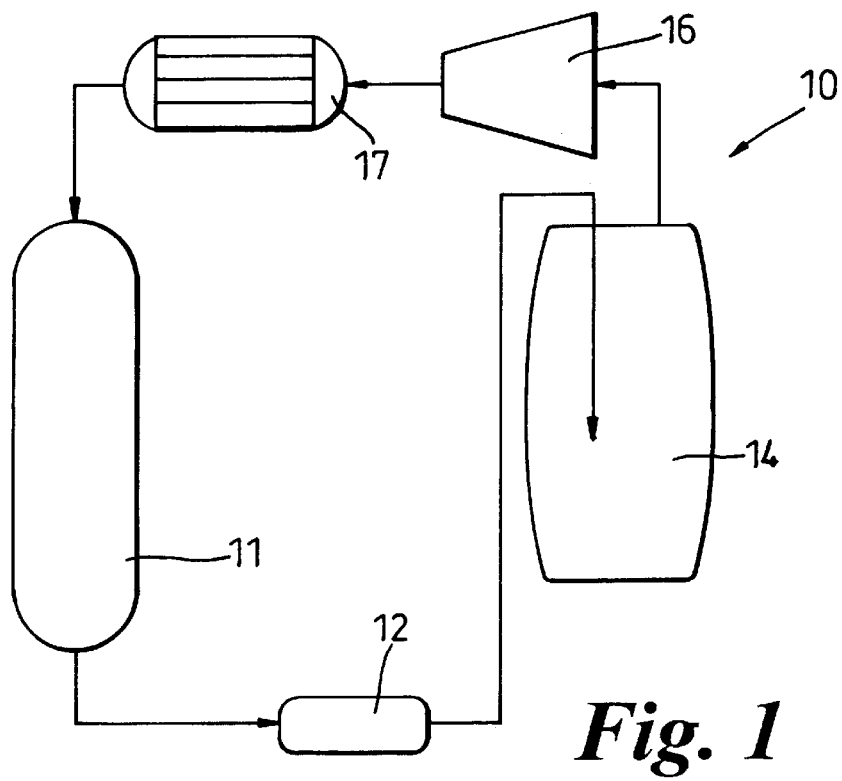
FIG. 1 is a schematic representation of a closed loop biomass extraction circuit not forming part of the invention but illustrating a biomass extraction method.
Figure 2:
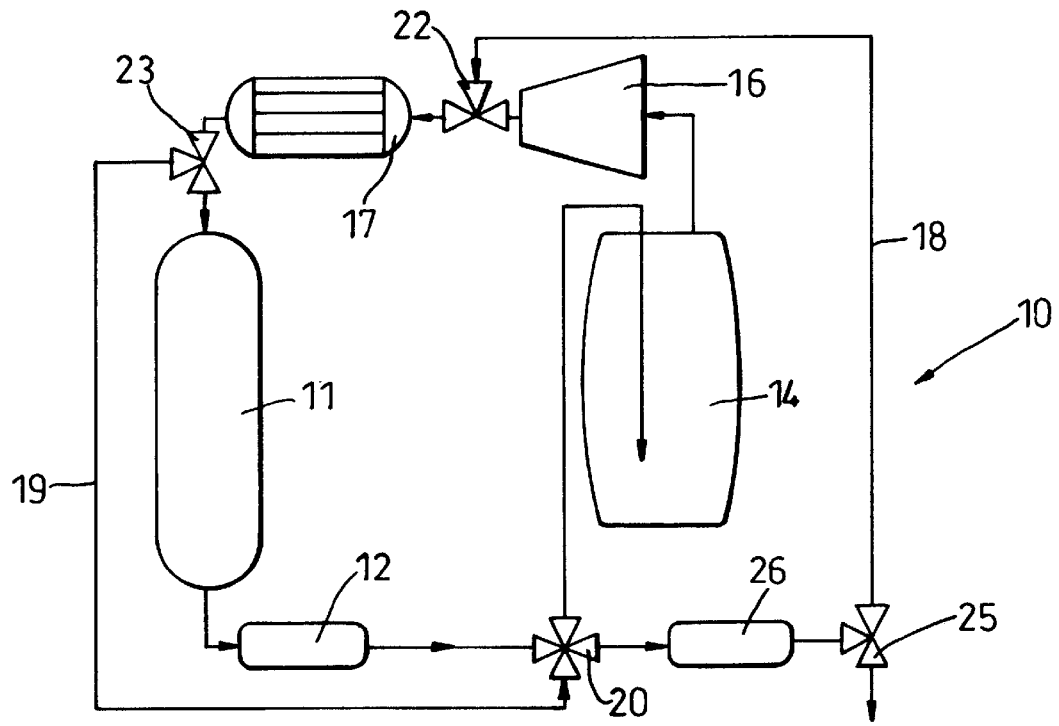
FIG. 2 shows the FIG. 1 apparatus modified in accordance with the invention.

A bypass line 18 for recovering contaminated liquid HFC solvent is operatively connectable in parallel with the evaporator 14 and compressor 16 of the FIG. 2 circuit.

A further bypass line 19 is operatively connectable in parallel with the extraction vessel 11 and filter 12.

Each bypass line 18,19 is connected to the main closed loop by means of respective switchable flow control valves 20,22,23,24 at each end thereof.

Bypass line 18 includes a further switchable flow control valve 25 for draining liquid HFC solvent from the apparatus 10.

Each flow control valve 20,22,23,24,25 may be operated under the control of e.g. a microprocessor operating process control software. Alternatively the valves may be manually switchable. This option is particularly desirable when, as is common in the biomass extraction art, the apparatus 10 is configured as a so-called "room-size" plant.

Bypass line 18 includes connected in-line a container 26 containing a bed of adsorbent and desiccant materials as defined herein. It will thus be seen that, when desired, valves 20 and 22 may be operated to circulate (optionally but not necessarily by pumping) liquid HFC solvent from extraction vessel 11 through the adsorbent and desiccant materials to purify the HFC solvent.

Usually this process occurs after extraction causing exhaustion of a bed of biomass in extraction vessel 11.

The bypass line 19 may be opened to permit the HFC solvent to bypass the extraction vessel 11 if desired during the purification (HFC recovery) process. The decision whether to use bypass line 19 can be taken e.g. on the basis of whether vessel is to be re-charged with the same biomass or a different biomass.

The FIG. 2 circuit is one in which, in use, the purification line 18 essentially forms part of the main flow loop of the extraction plant 10, and is circulated round the loop, e.g. by means of a pump. Thus the solvent recovery process in FIG. 2 washes the remainder of the circuit with solvent.

Figure 3:
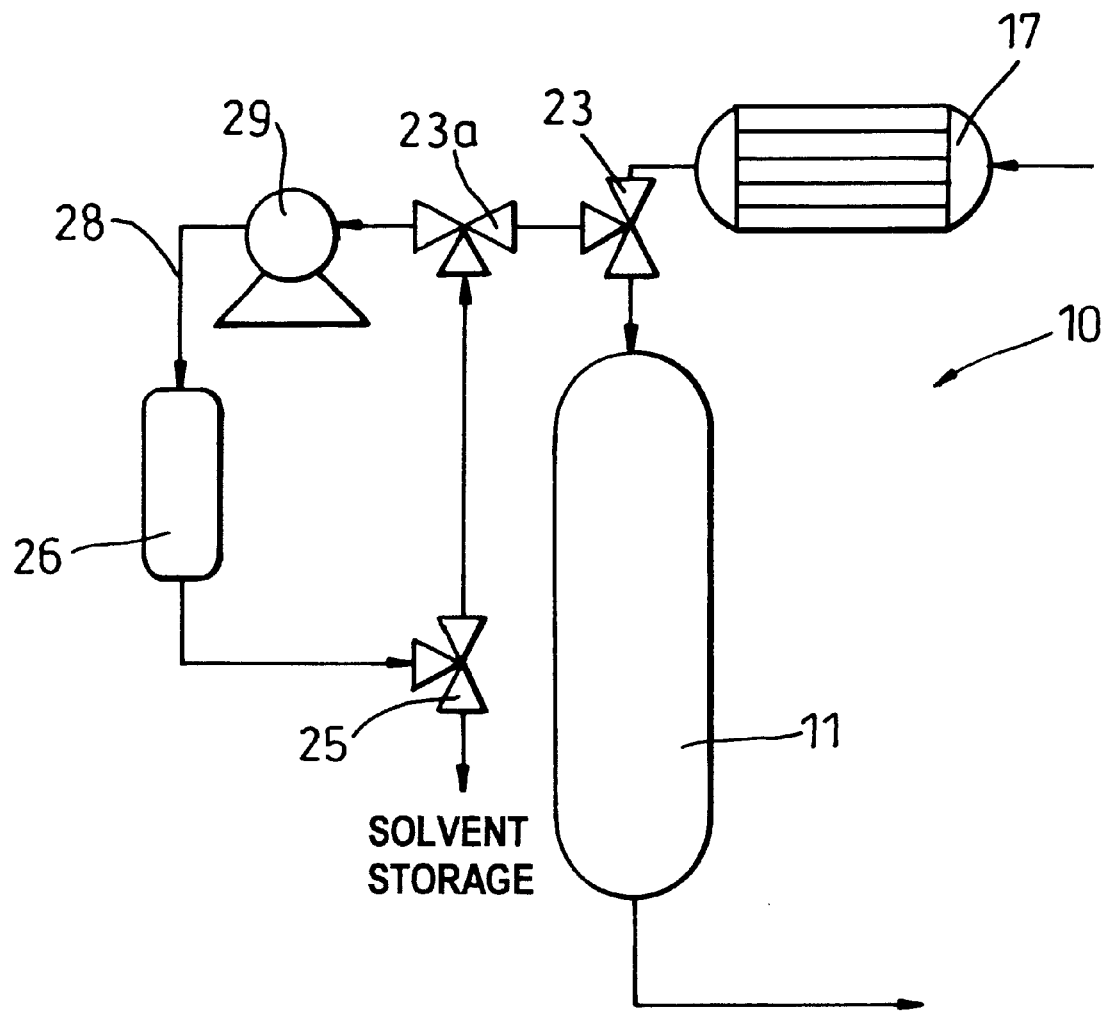
FIG. 3 shows a variant of part of the FIG. 2 apparatus.

An alternative arrangement is shown in FIG. 3. Here the recovery of HFC solvent occurs in a self-contained loop 28, that selectively draws contaminated HFC liquid from the main loop of the biomass extraction apparatus; and returns purified HFC solvent to the main loop or to a storage location, by means of switchable flow control valves 23, 23a and 25.

Self-contained loop 28 includes in series a pump 29 for circulating liquid HFC around the loop 28; and a container 26, similar to container 26 of FIG. 2, containing adsorbent and desiccant materials as defined herein.

Valve 25, for releasing liquid HFC solvent e.g. for storage purposes, is present in self-contained loop 28 and functions in the same way as in FIG. 2.

Loop 28 is essentially remote from, but selectively connectable to, the main loop of the apparatus 10.

The valves 23, 23a and 25 may be microprocessor controlled or manually switched.

Figure 4:
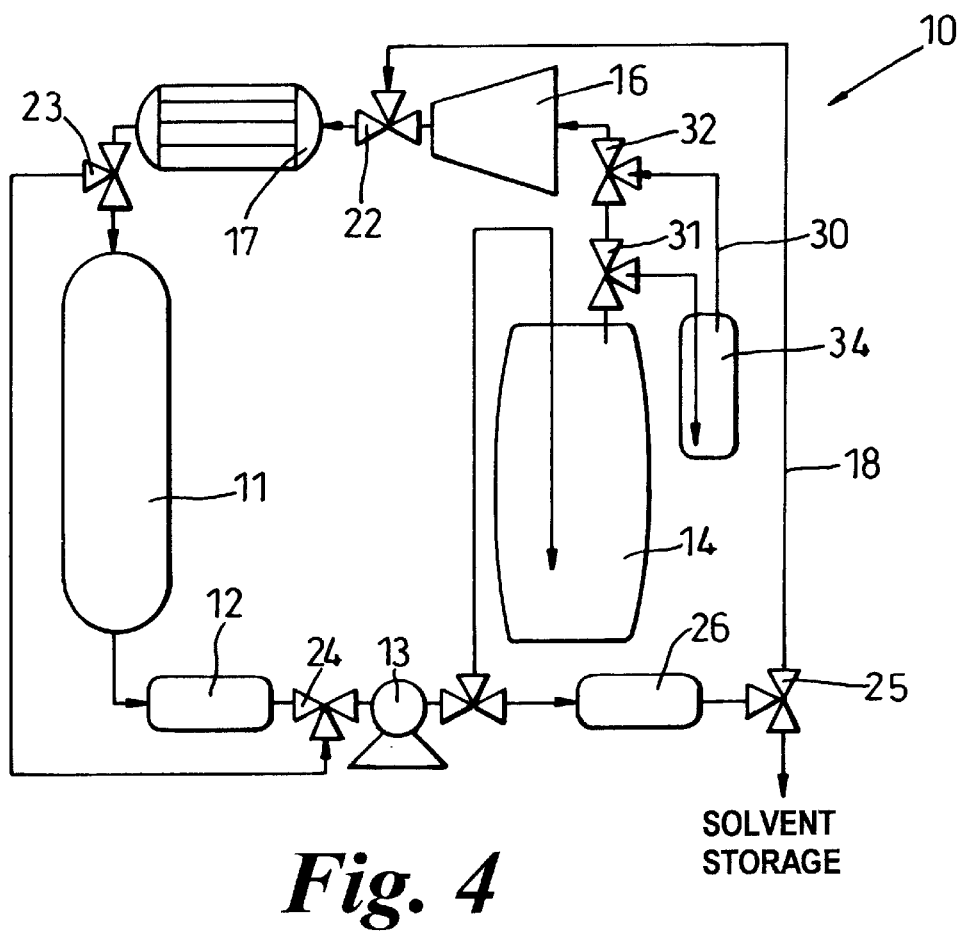
FIG. 4 shows a further embodiment of the invention.

Referring now to FIG. 4, there is shown a variant on the FIG. 2 apparatus, that is suitable for use when the solvent includes a co-solvent or entrainer, such as ethanol, whose physical properties differ significantly from those of HFC solvents.

The FIG. 4 apparatus 10 is similar to the FIG. 2 apparatus, with like reference numerals denoting like components, except that the main flow loop includes an additional branch loop 30 whose function is to remove excess ethanol from the HFC solvent by washing.

Branch loop 30 is selectively switchably connectable, by means of flow control valves 31 and 32 (that may be similar to the other flow control valves in the apparatus 10), to form part of the main flow loop.

Branch loop 30 includes an in-line connected hollow vessel 34 in which washing of HFC solvent vapour may take place. Vessel 34 may contain e.g. water, through which the HFC vapour is passed under pressure e.g. from an optional pump, Alternatively vessel 34 may contain a hydrophilic filter material (e.g. cellulose) moistened with water.

Branch loop 30 and vessel 34 may be located if desired at another point in the main loop of apparatus, for example if it is desired to wash the HFC at a point in the circuit where it is in liquid form. In this case the vessel 34 may be of the moist hydrophilic—filter type or may be water filed, and the ethanol (or other co-solvent/entrainer) may be removed from the liquid HFC by decanting one liquid from the other. The vessel 34 may if desired be removable from the apparatus 10 or at least moveable for this purpose.

Figure 5:
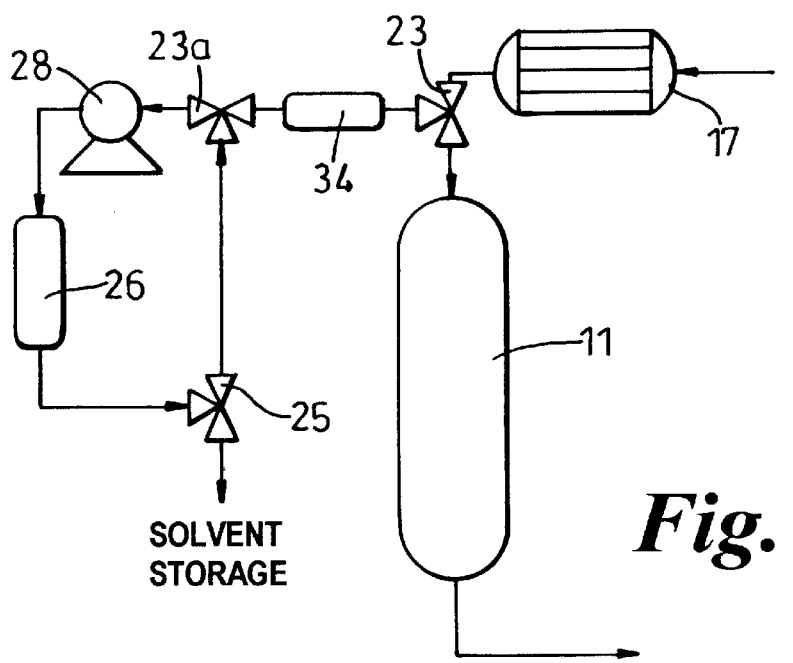
FIG. 5 shows a variant of part of the FIG. 4 apparatus.

FIG. 5 shows the washing vessel 34 incorporated into the FIG. 3 apparatus. Here the vessel 34 (which may be the same as vessel 34 in FIG. 4) is operatively connected in-line between valves 23 and 23a. Since in this embodiment vessel 34 treats working fluid downstream of condenser 17, the solvent mixture is in liquid form. For this reason the preferred construction of vessel 34 is the moistened hydrophilic type mentioned above, although a liquid water wash (whose content will require decanting as described above) may be used instead.

Regardless of the embodiment adopted, the preferred adsorbent for the organic contaminants is likely to be carbon-based, particularly an activated carbon derived from either plant materials such as coconut husk or from pyrolysis of fossil fuel materials. The desiccant may be selected from a range of conventional materials including silica gel, alumina and alumininosilicate molecular sieves. There will be particular advantage in using a combination of a molecular sieve desiccant with either silica gel or alumina, the molecular sieve being used to polish water after gross water removal by the bulk of the silica/alumina. The use of an alumina containing basic sites will also act to further reduce acidic organic components from the solvent whilst an alumina containing acidic sites will help to further reduce the levels of basic organic contaminants. The preferred aluminosilicate molecular sieves are likely to have a pore size of between 2 Å and 4 Å.

In use the contaminated HFC mixture may, after biomass extraction, be passed around the relevant circuit, contacting and being acted on by each of the purifying components in turn until adequate HFC purity results. The apparatus 10 may then be re-used for extracting biomass.

In the FIG. 4 and 5 embodiments a co-solvent/entrainer replenishment line, for supplying fresh co-solvent/entrainer to the apparatus 10, may be switchably connectable at a chosen location in the main flow loop. The purpose of this is to replenish co-solvent/entrainer removed from the circuit in vessel 34.

The amount of fresh material added may be controlled in dependence on the quantity of co-solvent/entrainer in the evaporator 14 following extraction. Such control may be driven by e.g. a programmed microprocessor, based on transducer readings; or may be manual.

What is claimed is:

1. A method of recovering a hydrofluorocarbon (HFC) solvent used for biomass extraction, comprising, after using the solvent to extract biomass,
   (a) passing the solvent through an adsorbent for organic contaminants; and
   (b) desiccating the solvent to reduce its water content.

2. A method according to claim 1 including repeating steps (a) and (b) until a desired level of solvent purity is obtained.

3. A method according to claim 1 following use of the solvent in a closed loop extraction circuit, wherein the steps (a) and (b) take place essentially in the closed loop, thereby solvent washing the solvent loop.

4. A method according to claim 1 following use of the solvent in a closed loop extraction apparatus, wherein the steps (a) and (b) take place in apparatus essentially remote from, but selectively connectable to receive solvent from, the closed loop.

5. A method according to claim 1 wherein the adsorbent is carbon-based.

6. A method according to claim 1 wherein the adsorbent is carbon-based; and wherein the adsorbent is or includes activated carbon derived from plant materials or from the pyrolysis of fossil fuels.

7. A method according to claim 1 including use of a desiccant selected from one or more aluminosilicate molecular sieves; silica gel; and alumina.

8. A method according to claim 1 including use of a desiccant selected from one or more aluminosilicate molecular sieves; silica gel; and alumina; and wherein the desiccant is or includes a combination of an aluminosilicate molecular sieve with silica gel and/or alumina.

9. A method according to claim 1 including use of a desiccant selected from one or more aluminosilicate molecular sieves; silica gel; and alumina; and wherein the alumina, when present, contains basic sites.

10. A method according to claim 1 including use of a desiccant selected from one or more aluminosilicate molecular sieves; silica gel; and alumina; and wherein the alumina, when present, contains acidic sites.

11. A method according to claim 7 including use of a desiccant selected from one or more aluminosilicate molecular sieves; silica gel; and alumina; and wherein the molecular sieve when present, includes pores having a diameter in the range of 2 Å to 4 Å.

12. A method according to claim 6 wherein the adsorbent and desiccant are in a common container.

13. A method according to claim 6 wherein the adsorbent and desiccant are in a plurality of containers.

14. A method according to claim 1 wherein the solvent includes an HFC solvent and an entrainer, the method including the steps of
   (c) removing the entrainer from the HFC solvent after its use in the extraction and before practising steps (a) and (b) on the HFC solvent; and
   (d) adding a quantity of pure entrained to the HFC after completion of steps (a) and (b).

15. A method according to claim 1 wherein the solvent includes an HFC solvent and an entrainer, the method including the steps of
   (c) removing the entrainer from the HFC solvent after its use in the extraction and before practising steps (a) and (b) on the HFC solvent; and
   (d) adding a quantity of pure entrainer to the HFC after completion of steps (a) and (b); and
      wherein the step (c) occurs by evaporating the HFC solvent from the HFC solvent entrainer mix in an evaporator; and storing the entrainer in the evaporator.

16. A method according to claim 1 wherein the solvent includes an HFC solvent and an entrainer, the method including the steps of
   (c) removing the entrainer from the HFC solvent after its use in the extraction and before practising steps (a) and (b) on the HFC solvent: and (d) adding a quantity of pure entrainer to the HFC after completion of steps (a) and (b);
    wherein the step (c) occurs by evaporating the HFC solvent from the HFC solvent/entrainer mix in an evaporator; and storing the entrainer in the evaporator; and
    wherein the step (d) includes adding fresh entrainer to the HFC solvent after completion of steps (a) and (b).

17. A method according to claim 16 wherein the quantity of fresh entrainer added is controlled in dependence on the quantity of entrainer retained in the evaporator.

18. A method according to claim 1 wherein the solvent includes an HFC solvent and an entrainer, the method including the steps of
    (c) removing the entrainer from the HFC solvent after its use in the extraction and before practising steps (a) and (b) on the HFC solvent; and
    (d) adding a quantity of pure entrainer to the HFC after completion of steps (a) and (b); and
including the step of
    (e) washing the HFC solvent before practising steps (a) and (b).

19. A method according to claim 18 wherein the step (e) includes one or more of passing the HFC solvent in vapour form through a pool of water;
    passing the HFC solvent through a hydrophilic filter material; or
    washing liquid HFC solvent with water and decanting the water and solvent from one another.

20. A method of recovering a hydrofluorocarbon (HFC) solvent used for biomass extraction, comprising, after using the solvent to extract biomass,
    (a) passing the solvent through an adsorbent for organic contaminants; and
    (b) desiccating the solvent to reduce its water content, wherein the method includes use of a desiccant that is or includes a combination of an aluminosilicate molecular sieve with silica gel and/or alumina.

21. A method according to claim 20 including repeating steps (a) and (b) until a desired level of solvent purity is obtained.

22. A method according to claim 1 following use of the solvent in a closed loop extraction circuit, wherein the steps (a) and (b) take place essentially in the closed loop, thereby solvent washing the solvent loop.

23. A method according to claim 1 following use of the solvent in a closed loop extraction apparatus, wherein the steps (a) and (b) take place in apparatus essentially remote from, but selectively connectable to receive solvent from the closed loop.

24. A method according to claim 1 wherein the adsorbent is carbon-based.

25. A method according to claim 1 wherein the adsorbent is or includes activated carbon derived from plant materials or from the pyrolysis of fossil fuels.

26. A method according to claim 1 wherein alumina, when present, contains basic sites.

27. A method according to claim 1 wherein the alumina, when present, contains acidic sites.

28. A method according to claim 1 wherein the molecular sieve, includes pores having a diameter in the range of 2Å to 2Å.

29. A method according to claim 1 wherein the adsorbnet and desiccant are in a common container.

30. A method according to claim 1 wherein the adsorbent and desiccant are in a plurality of containers.

31. A method according to claim 1 wherein the solvent includes an HFC solvent and an entrainer, the method including the steps of
    (c) removing the entrainer from the HFC solvent after its use in the extraction and before practising steps (a) and (b) on the HFC solvent; and
    (d) adding a quantity of pure entrainer to the HFC after completion of steps (a) and (b).

32. A method according to claim 31 wherein the step (c) occurs by evaporating the HFC solvent from the HFC solvent/entrainer mix in an evaporator; and storing the entrainer in the evaporator.

33. A method according to claim 32 wherein the step (d) includes adding fresh entrainer to the HFC solvent after completion of steps (a) and (b).

34. A method according to claim 33 wherein the quantity of fresh entrainer added is controlled in dependence on the quantity of entrainer retained in the evaporator.

35. A method according to claim 31 including the step of (e) washing the HFC solvent before practising steps (a) and (b).

36. A method according to claim 35 wherein the step (e) includes one or more of passing the HFC solvent in vapour form through a pool of water;
    passing the HFC solvent through a hydrophilic filter material; or
    washing liquid HFC solvent with water and decanting the water and solvent from one another.

* * * * *

UNITED STATES PATENT AND TRADEMARK OFFICE
CERTIFICATE OF CORRECTION

PATENT NO. : 6,710,216 B1
DATED : March 23, 2004
INVENTOR(S) : Corr et al.

It is certified that error appears in the above-identified patent and that said Letters Patent is hereby corrected as shown below:

Column 1,
Line 4, "exaction" should be deleted and replaced with -- extraction --.
Line 13, after "to" insert -- the --.
Line 22, "tifluoromethane" should be deleted and replaced with -- trifluoromethane --.

Column 2,
Line 41, "as defined in Claim 1." should be deleted and replaced with:
  -- of recovering a hydrofluorocarbon (HFC) solvent used for biomass extraction, comprising, after using the solvent to extract the biomass,
    (a) passing the solvent through an adsorbent for organic contaminants; and
    (b) desiccating the solvent to reduce its water content. --.
Line 50, "The aspects of the invention are defined in Claims 2 to 4." should be deleted and replaced with:
  -- In an aspect of the invention the aforementioned steps (a) and (b) are repeated until a desired level of solvent purity is obtained.
    In another aspect of the invention, following use of the solvent in a closed loop extraction circuit, the aforementioned steps (a) and (b) take place essentially in the closed loop, thereby solvent washing the solvent loop.
    In still another aspect of the invention, following use of the solvent in a closed loop extraction apparatus, the aforementioned steps (a) and (b) take place in apparatus essentially remote from, but selectively connectable to receive solvent from the closed loop. --.

Column 3,
Lines 10 and 11, "Solutions to this further problem are defined in Claims 12 to 17. Thus" should be deleted and replaced with:
  -- A solution to this further problem includes locating the adsorbent and desiccant in a common container.
    Another solution includes locating the adsorbent and desiccant in a plurality of containers.
    Still another solution includes the solvent being an HFC solvent and an entrainer, and the method includes the steps of (c) removing the entrainer from the HFC solvent after its use in the extraction and before practising the aforementioned steps (a) and (b) on the HFC solvent; and
    (d) adding a quantity of pure entrainer to the HFC after completion of the aforementioned steps (a) and (b).
    Still another solution includes the solvent being an HFC solvent and an entrainer, and the method includes the steps of

UNITED STATES PATENT AND TRADEMARK OFFICE
CERTIFICATE OF CORRECTION

| | |
|---|---|
| PATENT NO. | : 6,710,216 B1 |
| DATED | : March 23, 2004 |
| INVENTOR(S) | : Corr et al. |

It is certified that error appears in the above-identified patent and that said Letters Patent is hereby corrected as shown below:

Column 3 (con't),
    (c) removing the entrainer from the HFC solvent after its use in the extraction and before practising the aforementioned steps (a) and (b) on the HFC solvent;
    (d) adding a quantity of pure entrainer to the HFC after completion of the aforementioned steps (a) and (b);
    the step (c) occurrs by evaporating the HFC solvent from the HFC solvent/ entrainer mix in an evaporator, and storing the entrainer in the evaporator; and
    the step (d) includes adding fresh entrainer to the HFC solvent after completion of the aforementioned steps (a) and (b).
    Still another solution includes the aforementioned quantity of fresh entrainer which is added is controlled in dependence on the quantity of entrainer retained in the evaporator.
    Thus --.

Line 42, "as defined in Claim 18. Optional features of the apparatus are defined in Claims 19 to 22." should be deleted and replaced with:
    -- for extraction biomass using an HFC solvent, including an extraction vessel, an evaporator for the solvent, a compressor and a condensor connected in series in a closed loop extraction circuit; and one or more containers containing an adsorbent for organic contaminants and a desiccant, connectable in a solvent recovery loop to which solvent in the extraction circuit may selectively be supplied whereby solvent used in the extraction circuit may be supplied through the adsorbent and the desiccant.
    In an optional feature, the apparatus when in use includes that the recovery loop may be connected to form part of main circulation path of solvent passing around the extraction circuit.
    In another optional feature, the apparatus when in use includes that the recovery loop is fluidically isolated from the extraction circuit.
    In still another optional feature, the apparatus includes a washer for HFC solvent.
    In still another optional feature, the apparatus includes a washer for HFC solvent, and the washer includes one or more of a pool of water and means for selectively passing HFC solvent in vapour form through the pool;
    a hydrophilic material moistened with water and means for selectively passing the HFC solvent through the filter; or
    a water washer for liquid HFC solvent and means for decanting washing water and liquid HFC solvent from one another
    In still another optional feature, the apparatus includes a pump for pumping solvent in the circuit. --.

UNITED STATES PATENT AND TRADEMARK OFFICE
CERTIFICATE OF CORRECTION

PATENT NO. : 6,710,216 B1
DATED : March 23, 2004
INVENTOR(S) : Corr et al.

It is certified that error appears in the above-identified patent and that said Letters Patent is hereby corrected as shown below:

<u>Column 4,</u>
Line 33, after "and" insert -- in which solvent --.

<u>Column 5,</u>
Line 7, "pump," should be deleted and replaced with -- pump. --.
Line 12, "filed" should be deleted and replaced with -- filled --.

Signed and Sealed this

Third Day of August, 2004

JON W. DUDAS
*Acting Director of the United States Patent and Trademark Office*